United States Patent [19]

Mellan

[11] 3,765,894

[45] Oct. 16, 1973

[54] ELEVATED IMAGE PRINTING PLATE

[75] Inventor: Ibert Mellan, Flushing, N.Y.

[73] Assignee: Polychrome Corporation, Yonkers, N.Y.

[22] Filed: Aug. 5, 1971

[21] Appl. No.: 169,550

Related U.S. Application Data

[63] Continuation-in-part of Ser. No. 112,454, Feb. 3, 1971, abandoned, which is a continuation of Ser. No. 627,615, April 3, 1967, abandoned.

[52] U.S. Cl. .......................... 96/86, 96/36.3, 96/75, 96/93, 96/49

[51] Int. Cl. .......................... G03c 1/94

[58] Field of Search .......................... 96/93, 91, 75, 86

[56] References Cited

UNITED STATES PATENTS

| | | | |
|---|---|---|---|
| 3,100,150 | 8/1963 | Chismar et al. | 96/93 |
| 2,174,629 | 10/1939 | Greiner | 96/93 |
| 3,232,783 | 2/1966 | Deal et al. | 96/75 |
| 3,440,050 | 4/1969 | Chu | 96/86 |
| 2,199,865 | 5/1940 | Wood | 96/93 |
| 3,265,504 | 8/1966 | Leonard et al. | 96/75 |

FOREIGN PATENTS OR APPLICATIONS

| | | | |
|---|---|---|---|
| 1,058,690 | 2/1967 | Great Britain | 96/93 |

*Primary Examiner*—Norman G. Torchin
*Assistant Examiner*—R. L. Schilling
*Attorney*—Curtis, Morris & Safford

[57] ABSTRACT

There are disclosed herein photosensitive-thermosensitive compositions of polyvinyl alcohol polymers and polyvinyl acetate polymers having incorporated therein a photo-responsive sensitizer, which compositions are coated onto base surfaces such as sheets of the materials commonly used in the printing art to make either pre-sensitized or wipe-on printing plates, and which compositions react with or without a catalyst to cross-link and copolymerize when energy is applied to the coated sheets in the form of light and heat to make image-printing areas and non-image non-printing areas. Thick coatings of the compositions can be applied of which less than all of the coating in the non-image areas needs to be removed to give, in effect, a deep-etch plate that can be used as a dry offset printing plate.

5 Claims, No Drawings

ELEVATED IMAGE PRINTING PLATE

This application is a continuation-in-part of copending application Ser. No. 112,454 filed Feb. 3, 1971 now abandoned, which is a continuation of application Ser. No. 627,615 filed Apr. 3, 1967, now abandoned.

This invention relates to compositions for printing plates, and more particularly to photosensitive and thermosensitive compositions of polyvinyl alcohols, polyvinyl acetates and photo-responsive sensitizers for coating onto base surfaces to make printing plates.

The art of planographic printing depends upon the immiscibility of grease and water, upon the preferential retention of a greasy image-forming substance by an image area, and upon the similar retention of an aqueous dampening fluid by a non-image area. When a greasy image is imprinted upon a suitable surface and the entire surface is then moistened with an aqueous solution, the image area will repel the water and the non-image area will retain the water. Upon subsequent application of greasy ink, the image portion retains ink whereas the non-image area repels it. The ink on the image area is then transferred to the surface of a material on which the image is to be reproduced, such as paper, cloth and the like, via an intermediary, a so-called offset or blanket cylinder, which is necessary to prevent mirror-image printing.

The type of printing plate to which the present invention is directed has a coating of a light-sensitive substance that is adherent to a base sheet. The base sheet may comprise any of the materials known for this purpose, such as a flexible waterproof paper, a plastic or a thin sheet of metal, or laminates thereof. Typical metals include aluminum, steel, zinc, magnesium, chromium and copper. If the light-sensitive coating is applied to the base sheet by the manufacturer, the plate is referred to as a "presensitized plate." If the light-sensitive substance is applied to the base by the platemaker, the plate is referred to as a "wipe-on" plate.

Depending upon the nature of the photosensitive coating employed, the treated plate may be utilized to reproduce directly the image to which it is exposed, in which case it is termed a positive-acting plate, or to produce an image complementary to the one to which it is exposed, in which case it is termed a negative-acting plate. In either case the image area of the photosensitive coating is rendered oleophilic by appropriate treatment and the remaining portion of the coating is substantially removed by a developing treatment to define the non-image area.

In the case of a negative plate that is exposed to light through a negative transparency, the light-sensitive material, usually a diazo compound, is caused to harden and thereby become insoluble in a desensitizing solution which is applied to negative plates after light exposure for the purpose of removing that part of the light-sensitive coating which, because it was protected from the light by the negative, was not light-hardened. The light-hardened surface of a negative plate will be the oleophilic surface which is compatible with the greasy ink and is called the "image area;" the surface from which the non-hardened light-sensitive material has been removed by a desensitizer will be or can be converted to a hydrophilic surface having little affinity for the greasy ink and is called the "non-image area."

A positive plate is generally one upon which the non-image area is the portion of the light-sensitive diazo compound exposed to light while the unexposed portion is adapted to be converted by chemical reaction to a hardened oleophilic ink-receptive image area.

Because paper is relatively coarse grained and has a tendency to stretch, a plate having a metallic base generally provides finer reproduction and longer service than does a paper base plate. In coating a metallic plate with a light-sensitive material, however, it is highly desirable initially to provide the metal with a hydrophilic surface to which the light-sensitive coating adheres and which becomes the ink-repulsive non-image area upon removal of the unconverted unhardened light-sensitive material. It is known to produce such hydrophilic surfaces on metallic plates for planographic printing purposes by various procedures.

It is an object of this invention to provide improved printing plates. Another object of this invention is to provide printing plates with a photosensitived polyvinyl alcohol/polyvinyl acetate coating having improved properties such as hardness and solvent resistance. It is also an object to provide printing plates having an elevated image. A further object is to provide a process for preparing printing plates with aluminum bases having improved properties. These and other objects of this invention will be in part discussed and in part apparent in the more detailed disclosure herein below.

Broadly this invention encompasses photosensitive-thermosensitive compositions of polyvinyl alcohol polymers and polyvinyl acetate polymers having incorporated therein a photo-responsive sensitizer, which compositions are coated onto base surfaces such as sheets of the materials commonly used in the lithographic art and which compositions react with or without a catalyst to cross-link and co-polymerize when energy is applied to the coated sheets in the form of, for example, light and heat. Such compositions can be coated onto appropriate base sheets by manufacturers of presensitized printing plates or can be applied by trade platemakers to prepare wipe-on plates. A rather thick coating can be applied, for example, by successively coating a base sheet with a number of coats of the composition, of which less than all of the coating in the non-image areas needs to be removed and which gives, in effect, a deep-etch plate that can be used as a dry offset printing plate. Plates made from anodized aluminum base sheets coated with the compositions of this invention are unusually resistant to peeling of the over-coated layer.

Polyvinyl alcohol polymers and polyvinyl acetate polymers can be blended in a wide range of proportions to form compositions according to this invention. Although there presently appear to be no critical limits on the minimum amount of either polymeric component, it is generally advantageous to use at least about one part by weight of polyvinyl acetate polymers per part by weight of polyvinyl alcohol polymers, and up to about 15 parts of polyvinyl acetate polymers. For best results it is presently preferred to use at least about 2, and more preferably between about 4 and about 8, parts by weight of polyvinyl acetate polymers per part of polyvinyl alcohol polymers. Polyvinyl alcohol polymers preferably are used in the form of their aqueous solutions. Such solutions are available commercially, for example, from the Du Pont company under the trade designation "Elevanol," e.g., numbers 52–22 or 51–05, stencil grade, or number 50–42, and from Stein, Hall & Company, Inc., of New York City. These polyvinyl alcohols are water-soluble and partially hydrolyzed to an extent of about 85 to about 90 percent, e.g., about 87 to about 89 percent. Similarly, the polyvinyl acetate polymers are conveniently used in the form of their aqueous emulsions which are commercially available, for example, from DuPont as Elvacet polyvinyl acetate emulsions, e.g., grade 81–900, and from Stein, Hall & Company, Inc., as Vinrez 202–A. Those solutions and emulsions are used in amounts such that their solids content of polyvinyl alcohol polymers and polyvinyl acetate polymers are in the relative proportions previously mentioned. The amount of solvent or emulsifying liquie, i.e., water, does not presently appear to be critical.

As photo-active sensitizers there can be used a variety of materials, particularly inorganic dichromates such as ammonium, sodium and potassium dichromate, and photosensitive diazo compounds of the negative-acting type as are well-known in the lithographic art. The preferred sensitizers are the dichromates mentioned and diazo compounds that are the reaction product of aldehydes and diazo-containing aromatics such as formaldehyde and paradiazo-diphenylamines. The latter are commercially available from Andrews Paper and Chemical Co., Inc., Port Washington, New York and from other diazo makers. The sensitizer can be used in an amount of about 0.5 to about 10 percent by weight calculated on the amount of polymer solids, and it is advantageous to use between about 1 and about 6 percent. Best results appear to be attainable using between about 1.5 and about 3.5 percent of sensitizer by weight calculated on the weight of polymer solids in the composition.

Compositions made from commercially available solutions of polyvinyl alcohol polymers and emulsions of polyinvyl acetate polymers in the proportions mentioned above generally have sufficient fluidity to be handled easily, e.g., for coating onto base sheets. Such compositions have approximately 1 to 6 times more water than polymer solids calculated by weight. For some applications, for example, to provide a composition with which to make wipe-on plates, it is desirable to dilute the initial composition with a solvent. Water of course is the principal diluent although common organic solvents that are water-miscible and do not effect either the polymers or the sensitizer also can be used. The latter include methanol, n-propanol, isopropanol, ethanol, glyoxal and acetone. Dilution of the initial composition with up to about four corresponding volumes of diluent provides a very fluid composition in which the aqueous medium can be up to about 25 times by weight the amount of polymer solids. A preferred dilution is with up to about two corresponding volumes each of water and of isopropanol, and still more preferably, about equal parts of them. The undiluted compositions tend to gel on standing; dilution tends to retard gelation, especially dilution with a diluent that is partly an organic solvent.

Conventional methods in the lithographic art can be used to coat the compositions onto base sheets and to dry them thereon. Care should be taken during drying not to heat at high temperatures for prolonged periods because the compositions tend to undergo reaction. A warm air current of up to about 50° C. for a few minutes, or a corresponding amount of heat from an energy source such as an infrared lamp, will ordinarily be sufficient to dry the coating without curing it to any untoward extent. Successive coats can then be applied, if desired, to build up a rather thick coating from which a plate having an elevated image can be made and used as a dry offset plate. The coating in that instance should be at least about 0.005 inch thick. In general the thickness of the coatings vary over a wide range depending mainly on the fluidity of the composition, the method by which it is applied and the number of coatings applied. Ordinarily the thickness of the coating on the base will be between about 0.0001 inch and about 0.02 inch.

The base sheet selected for a particular plate should be clean and can be prepared in conventional ways. For example, in the case of aluminum sheets, they are degreased, etched or grained, and rinsed with water. Anodized aluminum sheets are also suitable, and give strong bonds with the photosensitive coating composition. Satisfactory anodizing can be accomplished in a hydrochloric acid bath of about 0.20N to about 0.50N strength with an alternating current of about 6 to about 20 volts.

Either a pre-sensitized plate or a wipe-on plate prepared as described can be exposed through a negative transparency of an image to be reproduced by means of an actinic light source, for example, a carbonarc source or preferably an ultraviolet source. The area of the coated plate exposed to the light is the image area in which a hardened substantially water-insoluble resin-complex is formed by reaction within the coating, presumably by copolymerization and crosslinking of the polyvinyl alcohol and the polyvinyl acetate polymers during the exposure. The time of exposure is dependent on a number of factors including the intensity of the light energy applied, the duration of time it is applied, and the thickness of the coating on the plate. A typical time period using ultraviolet light is between about one and ten minutes.

After exposure the plate is developed by removing part or all of the unexposed non-image area. That is done by dissolving the photosensitive coating composition in a solvent, suitably warm or hot water, which solubilizes that composition to a much greater extent than the hardened exposed image area. Organic solvents such as water-soluble alcohols and ketones, e.g., methanol, propanol and acetone, can also be used to develop the plate, particularly if such a solvent was used as a diluent for the composition prior to coating. Such solvents, however, tend more to dissolve the hardened exposed resin-complex area of the coating. Cold water can also be used but the time required to develop the plate is longer. Water at a temperature between about 70° and 120°F. is preferred. It is also preferred to include in the developer a small amount of sodium silicate, e.g., about 0.05 to about 0.5 percent by weight of the solution, which has been found to improve greatly the action of the developing solution. It is possible to apply a developing ink such as commonly used in the lithographic art to the plate after exposure but prior to developing. The ink can be in a conventional solution, or it can be included either in the developing solution or in the aqueous coating composition itself. Caution should be observed that the ink does not cause gelation or insolubilization of the polymers in the coating composition. In the case of plates having thick coatings, suitable for making elevated images for use as dry offset plates, it is not necessary to remove all of the photosensitive composition in the unexposed non-image area, although enough should be removed so that the thickness of that area is not more than about one-half the thickness of the coating in the image area.

The developed plate is then heat-treated to harden further the resin complex image area, to cure it and to render it water-insoluble and oleophilic. The heat-treating also sharpens the image and bonds the coating firmly to the base sheet, particularly to metal bases such as aluminum. Heat-treating can be done by baking in air at varying times and temperatures depending upon the nature of the resin complex and the thickness of the coating. Typical of time and temperature are between about 3 minutes and 2 hours and from about 50°C. to about 200°C. A hard cure of the image is particularly desirable for elevated image plates and can be achieved at about 100° to 130°C. for about one-half hour or up to about 200°C. for from 3 to 10 minutes. Other curing means can be used, such as an ultraviolet lamp at 40° to 50°C. for about one-half hour. Thereafter the plate can be wetted with a diluted gum arabic solution or the like wetting solution known in the art, and is ready to be placed on a press and run.

The following examples are set forth to illustrate more fully this invention but are not intended to limit its scope as described herein above

EXAMPLE 1

An aqueous composition was formulated with 600 cc. of a 12 percent aqueous solution of polyvinyl alcohol available from the DuPont company as Elvanol 52–05, 300 cc. of a 1 percent aqueous solution of alpha-zurine dye, F.G.N.D. conc., sold by National Aniline Div. of Allied Chemical Corp., 100 cc. of water containing 12 gms. of ammonium dichromate, and 1,000 cc. of a polyvinyl acetate emulsion in water (55 percent solids), available from Stein, Hall & Company as Vinrez 202–A, to form a photosensitive coating composition. The composition was allowed to stand for several hours to permit the evolution of air bubbles, and was then coated onto an anodized aluminum base sheet to form a photosensitive and thermosensitive printing plate.

EXAMPLE 2

Using the coating composition described in Example 1, a dry offset plate was prepared by coating successively four layers of the composition onto an anodized aluminum plate, each application of composition being dried prior to application of the next coating.

EXAMPLE 3

A coating composition and a photosensitive-thermosensitive printing plate were made as described in Example 1 except that 1 gm. of ammonium dichromate and 11 gms. of potassium dichromate were used.

Example 4

A coating composition and a photosensitive-thermosensitive printing plate were made as described in Example 1 except that 2 gms of ammonium dichromate and 10 gms. of sodium dichromate were used.

EXAMPLE 5

A photosensitive coating composition and a photosensitive-thermosensitive printing plate were made as described in Example 1 except that 4 gms. of ammonium dichromate, 4 gms. of potassium dichromate and 4 gms. of sodium dichromate were used.

EXAMPLE 6

An aqueous composition was formulated with 600 cc. of the polyvinyl alcohol solution previously described, 600 cc. of water containing 10 gms of a negative-acting diazo, Diazo Resin A sold by Andrews Paper and Chemical Co., and 1000 cc. of the polyvinyl acetate emulsion mentioned in Example 1. Several coats of that photosensitive-thermosensitive composition were applied onto a grained wipe-on plate, which had been cleaned and etched, by means of a whirler that rotated the plate at about 500 RPM. Each coating was dried in warm air at about 60°C. after which the plate was exposed to ultraviolet light for 10 minutes through a negative transparency. The exposed plate was developed in hot water containing about 0.1 percent by weight of sodium silicate and then was heated in a hot air oven at 350°F. for 10 minutes. The plate thus prepared was put onto an offset printing press on which it produced over one thousand high quality prints.

EXAMPLE 7

A printing plate was prepared by wiping the coating composition described in Example 6 onto a grained wipe-on plate. Prior to applying the composition it was diluted with our corresponding volumes of water.

EXAMPLE 8

A printing plate was prepared as described in Example 6 except that an anodized aluminum base sheet was used; a strong bond was obtained.

EXAMPLE 9

A printing plate was prepared by wiping on as described in Example 7 except that a grained aluminum wipe-on base sheet was used.

EXAMPLE 10

A photosensitive-thermosensitive coating composition was formulated by adding 250 cc. of a polyvinyl acetate emulsion, Vinrez 202–A, to 600 cc. of a 12 percent solution of polyvinyl alcohol, Elvanol 52–05, and 600 cc. of water containing 12 gms. of ammonium dichromate. The composition was coated onto suitable base sheets which either had been grained mechanically, grained chemically or anodized. Those printing plates were exposed and developed, and when placed on an offset press ran strong and clean.

EXAMPLE 11

A photosensitive-thermosetting coating composition was formulated by adding 2000 cc. of a polyvinyl acetate emulsion, Vinrez 202–A, to 600 cc. of a 12 percent solution of polyvinyl alcohol, Elvanol 52–22, and 600 cc. of water containing 12 gms. of ammonium dichromate. The composition was coated onto suitable base sheets to make printing plates that were exposed and developed. Those plates yielded good copies when run on an offset press.

EXAMPLE 12

A photosensitive-thermosensitive coating composition was formulated with 600 cc. of a 12 percent solution of polyvinyl alcohol, Elvanol 52–22, 12 gms. of ammonium dichromate and 1000 cc. of polyvinyl acetate, Vinrez 202–A. (A.) A 200 cc. portion of that composition was diluted with an equal volume of water and 2 equal volumes of isopropanol. The solution thus prepared gelled on standing for 2 days, but the gel could be thinned by adding water. (B.) A 50 cc. portion of that composition was diluted with 50 cc. of water and 50 cc. of isopropanol. (C.) A 100 cc. portion of that composition was diluted with 75 cc. of water and 100 cc. of isopropanol.

Each of those diluted compositions was coated onto base sheets and made into good printing plates which yielded clean and sharp copies.

EXAMPLE 13

A photosensitive-thermosensitive coating composition was prepared by mixing 600 cc. of a 12 percent aqueous solution of polyvinyl alcohol, 600 cc. of water containing 12 gms. of ammonium dichromate and 500 cc. of an aqueous emulsion of polyvinyl acetate, and then diluting with 4 corresponding volumes of water. To make printing plates, the composition was then wiped onto aluminum plates which had been grained, either mechanically or chemically, or anodized. The plates produced good copies.

EXAMPLE 14

A. A photosensitive coating composition was formulated with 60 cc. of a 12 percent solution of polyvinyl alcohol, 50 cc. of an emulsion of polyvinyl acetate, 110 cc. of water, 110 cc. of isopropanol, about 1.5 gms. of Andrews Diazo Resin A and 0.5 gm. of a sensitizer, Unvinul D–50 sold by Antara Chemicals division of General Aniline and Film Corp.

B. A composition similar to the one described in (A.) but containing twice the specified amounts of water and isopropanol was prepared.

Those two compositions were each wiped onto suitable base sheets that were dried, heat-treated, exposed and developed. The resulting printing plates were used on an offset press on which they produced good copies.

It will of course be apparent to those skilled in the art that numerous changes in the ingredients, proportions and conditions set forth can be made in the foregoing examples without departing from the scope of the invention as defined in the claims appended herein below.

I claim:

1. A light-sensitive and heat-sensitive sensitized printing plate adapted to be exposed to light to form an image area, developed to remove an unexposed non-image area, and heat-treated to harden said image area which comprises: a base sheet of aluminum anodized in hydrochloric acid of about 0.20 N to about 0.50N strength with an alternating current of about 6 to about 20 volts; and a coating on a surface of said base sheet, which coating is light-sensitive and heat-sensitive, is at least about 0.005 inch thick, and contains (a) one part of a water-soluble polyvinyl alcohol homopolymer consisting of a hydrolyzed produce of a polyvinyl acetate homopolymer wherein about 85 to about 90 percent of the carboxyl groups are hydrolyzed to -OH groups, (b) from about two parts to about 15 parts of a substantially unhydrolyzed water-soluble polyvinyl acetate homopolymer, and (c) from about 0.005 part to about 0.10 part per part of said (a) and (b) of a light-sensitive sensitizer that is an alkaline salt of a dichromate compound or a negative-acting condensation product of a diazonium compound and an aldehyde compound, said parts being by weight.

2. A printing plate according to claim 1 wherein said polyvinyl alcohol (a) is a polyvinyl acetate homopolymer hydrolyzed to an extent of about 87 to about 89 percent.

3. A printing plate according to claim 1 wherein said polyvinyl acetate (b) is present in an amount of about 2 to about 8 parts.

4. A printing plate according to claim 1 wherein said polyvinyl acetate (b) is present in an amount of about 2.5 to about 4 parts.

5. A printing plate according to claim 1 wherein said sensitizer is used in an amount of about 0.01 to about 0.06 part.

* * * * *

UNITED STATES PATENT OFFICE
CERTIFICATE OF CORRECTION

Patent No. 3,765,894 Dated October 16, 1973

Inventor(s) Ibert Mellan

It is certified that error appears in the above-identified patent and that said Letters Patent are hereby corrected as shown below:

Column 3, line 14, "liquie" should read "liquid"

Column 3, line 36, "polyinvyl" should read "polyvinyl"

Column 6, line 36, "our" should read "four"

Column 7, lines 37-8, "Unvinul" should read "Uvinul"

Column 8, line 20, "produce" should read "product"

Signed and sealed this 12th day of March 1974.

(SEAL)
Attest:

EDWARD M.FLETCHER,JR.
Attesting Officer

C. MARSHALL DANN
Commissioner of Patents

USCOMM-DC 60376-P69
★ U.S. GOVERNMENT PRINTING OFFICE : 1969 O—366-334.